(12) United States Patent
Paul et al.

(10) Patent No.: US 12,047,421 B2
(45) Date of Patent: Jul. 23, 2024

(54) METHODS, SYSTEMS, AND DEVICES FOR ASSIGNING POLICIES IN NETWORKING SYSTEMS

(71) Applicant: Ruckus IP Holdings LLC, Claremont, NC (US)

(72) Inventors: Amit Paul, Bengaluru (IN); Satyendra Mohapatra, Bengaluru (IN); Padmasekar Easwaradas Kreedapathy, Bengaluru (IN); Anuradha Gade, Pleasanton, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 295 days.

(21) Appl. No.: 17/529,712

(22) Filed: Nov. 18, 2021

(65) Prior Publication Data

US 2022/0159040 A1 May 19, 2022

Related U.S. Application Data

(60) Provisional application No. 63/115,285, filed on Nov. 18, 2020.

(51) Int. Cl.
*H04L 9/40* (2022.01)
(52) U.S. Cl.
CPC .......... *H04L 63/20* (2013.01); *H04L 63/0884* (2013.01); *H04L 63/102* (2013.01)

(58) Field of Classification Search
None
See application file for complete search history.

(56) References Cited

U.S. PATENT DOCUMENTS

| | | | |
|---|---|---|---|
| 8,661,241 B1* | 2/2014 | Orr | H04L 63/14 709/224 |
| 2013/0139263 A1* | 5/2013 | Beyah | H04L 63/1408 726/23 |
| 2018/0191593 A1* | 7/2018 | De Knijf | H04L 41/50 |
| 2020/0162517 A1* | 5/2020 | Wong | H04L 63/0236 |
| 2021/0367847 A1* | 11/2021 | Vasseur | H04L 43/10 |

* cited by examiner

*Primary Examiner* — Brian Whipple
(74) *Attorney, Agent, or Firm* — Myers Bigel, P.A.

(57) ABSTRACT

The continued usage of manual & static configurations as the number of network-connected devices has increased has resulted in administrative difficulties for operators and/or administrators of computer networks. To provide more automated configurations, methods, systems, and electronic devices are described that include identifying, based on received network traffic from an end electronic device, a device type of the end electronic device; and applying a network policy to subsequent network traffic between the end electronic device and network equipment (such as a switch) based on the identified device type of the end electronic device.

10 Claims, 8 Drawing Sheets

METHODS, SYSTEMS, AND DEVICES FOR ASSIGNING POLICIES IN NETWORKING SYSTEMS

CROSS-REFERENCE TO RELATED APPLICATION

The present application claims the benefit of priority to U.S. Provisional Application No. 63/115,285, filed Nov. 18, 2020, with the United States Patent and Trademark Office, and the entire contents of the above-identified application are incorporated by reference as if set forth herein.

TECHNICAL FIELD

The present disclosure relates to networking systems, and more specifically relates to methods, systems, and devices for assigning policies and/or policy parameters to devices within networking systems.

BACKGROUND

Some recent efforts in computer- and networking-based research and development have focused on enhancing various electronic devices and enabling such devices to connect to networks. For example, telephone technologies remained largely unchanged from their invention in the late nineteenth to the late twentieth century and relied on circuit-switched networks to transmit analog voice signals. Now, many telephone calls are completed using digitized packet-switched networks, and the deployment of VoIP, or voice over IP (Internet Protocol), and other voice and telephony technologies have resulted in the telephones that can connect and communicate using general networks (such as local area networks (LANs) and/or the Internet). As another example, video cameras, such as those used in surveillance, have moved from analog closed-circuit networks to being packet-based devices that connect to general networks (such as LANs and/or the Internet) and transmit packets of information toward a destination.

More recently, there has been significant movement and interest in developing an "Internet of Things" (IoT), in which even broader categories of devices, such as appliances, infrastructure devices, transportation devices, farming devices, and so on, are connected to computer-based networks. Embedded sensors, actuators, and communication capabilities in these devices can result in each device being configured transmit and receive data, thereby providing remote monitoring and/or control of such devices.

SUMMARY

Aspects of the present disclosure provide various ways of configuring a connection between a networking device and a networking system, including deployment of network policies that govern communication between the networking device and the networking system. For example, a method is provided that may include receiving, by a first electronic device, network traffic from a second electronic device; identifying, based on the network traffic received from the second electronic device, a device type of the second electronic device; and applying a network policy to subsequent network traffic between the first electronic device and the second electronic device based on the identified device type of the second electronic device.

In some embodiments, applying the network policy to the subsequent network traffic may include identifying that the device type is a known device type; and retrieving a device profile associated with the identified device type of the second electronic device. The device profile may indicate that authorization of the second electronic device and/or a user of the second electronic device is required.

In some embodiments, applying the network policy to the subsequent network traffic may include communicating authentication information from the first electronic device to an authenticating device; receiving an indication from the authenticating device that the second electronic device and/or the user of the second electronic device is authorized; and applying the network policy based on the indication that the second electronic device and/or the user of the second electronic device is authorized.

In some embodiments, applying the network policy to the subsequent network traffic may include communicating authentication information from the first electronic device to an authenticating device; receiving an indication from the authenticating device that the second electronic device and/or the user of the second electronic device is not authorized; and applying the network policy based on the indication that the second electronic device and/or the user of the second electronic device is not authorized.

In some embodiments, the network policy may be indicated by the device profile.

In some embodiments, applying the network policy to the subsequent network traffic may include identifying that the device type is an unknown device type; and retrieving a device profile associated with unknown device types.

According to some embodiments of the present disclosure, an electronic device may include a processor; and memory, coupled to the processor, configured to store program instructions, wherein, when executed by the processor, the program instructions cause the electronic device to perform operations. The operations may include receiving, by a first electronic device, network traffic from a second electronic device; identifying, based on the network traffic received from the second electronic device, a device type of the second electronic device; and applying a network policy to subsequent network traffic between the first electronic device and the second electronic device based on the identified device type of the second electronic device.

As an example, the electronic device may be a network switch.

According to some embodiments of the present disclosure, a method may include receiving, by a first electronic device, network traffic from a second electronic device; identifying, based on the network traffic received from the second electronic device, a device type of the second electronic device; retrieving a device profile associated with the identified device type of the second electronic device; detecting that the device profile indicates that authorization of the second electronic device and/or a user of the second electronic device is required; communicating authentication information from the first electronic device to an authenticating device; and selectively applying a first network policy or a second network policy to subsequent network traffic between the first electronic device and the second electronic device based on a received communication from the authenticating device indicating an authorization status of the second electronic device and/or the user.

Other embodiments of the inventive concepts provided herein will be discussed further below and/or will be apparent to those of skill in the art based on the disclosed inventive concepts and examples of embodiments thereof.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
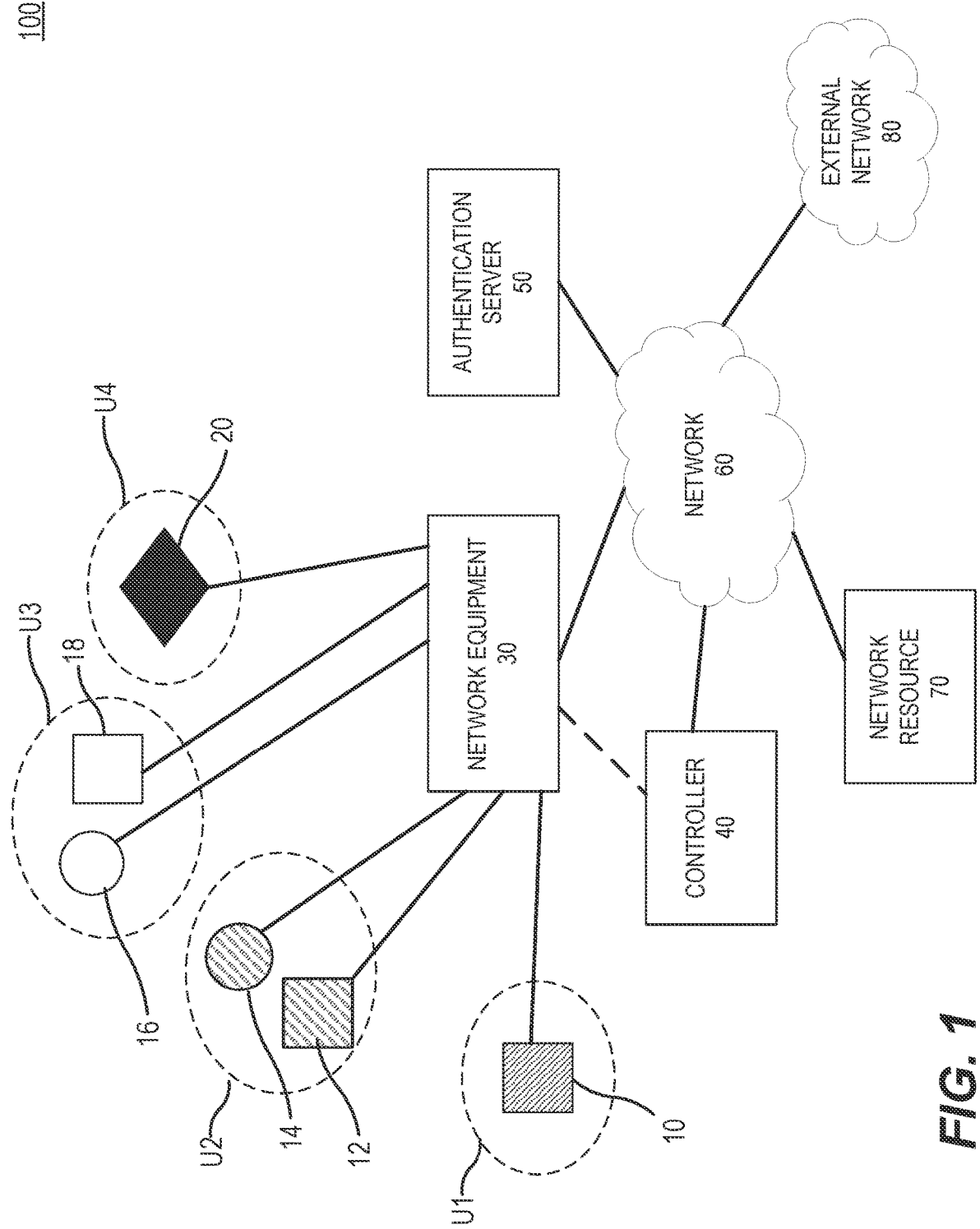
FIG. 1 is a block diagram illustrating an example of a networking system and communication among electronic devices within the networking system in accordance with embodiments of the present disclosure.

The IoT movement is still nascent; however, some obstacles to achieving long-term goals of IoT have already been identified. Some of these obstacles also exist with respect to the connection of devices to networks generally. For example, the marketplace of devices is diverse, with competing commercial entities offering a variety of devices.

Additionally, there can be a potentially significant amount of configuration involved in connecting a device to a network. For example, a device may need to be initially configured to connect to a network, then physically connected to the network (either via a wired connection or a wireless connection). Such a physical connection is established between the device and networking equipment such as a switch (when the connection is a wired connection) or access point (when the connection is a wireless connection). The connection itself also needs to be configured to ensure both that the device has appropriate access to other devices or resources on the network and that the device is prohibited from inappropriate access to devices or resources on the network. Configuration of the connection can occur prior to and/or subsequent to the establishing of the connection.

In some example embodiments, one way of configuring the connection between the device and the networking equipment is deployment of a network policy that governs the communication between the device and the networking equipment. A network policy may be a set of rules, constraints, conditions, and/or settings that define or shape communication between a device and a network. A network policy may designate whether a device is authorized to connect to the network as well as the circumstances under which the device can or cannot connect.

Network policies may govern a wide variety of attributes of a connection. For example, some network policies may be based on a user of the device. High-level users such as administrators, developers, and network operators may have a greater set of access rights and may need to be able to perform a greater set of tasks on the network than users than other users or guests to the network. As another example, an engineer may need access to sensitive product data, while an accountant may need access to sensitive financial data. Some users may be permitted to access external resources (e.g., webpages), and some users may be prohibited from going beyond the local network.

Various applications running on devices attempting to use the network may have different requirements and connection needs. Some applications require access beyond the local network, some applications are bandwidth-intensive, and some applications may be categorically prohibited according to an acceptable use policy of an organization (e.g., social media, online shopping).

Types of data (e.g., video data, telephony data) may also have different requirements, which may be defined according to a specific quality-of-service (QoS) policy to help optimize performance levels.

As will be discussed in greater detail below, the type of device may also be an attribute that may be used to define aspects of a network policy between the device and the network. For example, devices that have a high degree of user interaction such as computers, smartphones, and tablets may be permitted to access a greater amount of information and/or perform different types of operations on a network than devices that have a low degree of user interaction (or devices that do not interact with users at all), such as sensing devices (e.g., temperature or humidity sensors), surveillance equipment (e.g., cameras) and connected appliances (e.g., refrigerators).

Additionally, network infrastructures can be segmented into multiple virtual networks (e.g., a layer-2 VLAN) to facilitate manageability. A network policy may define the virtual networks/VLANs that an end device is "connected" to, and the network policy may also define membership in one or more virtual networks/VLANs for a port of the networking equipment to which the end device is attached.

The present disclosure is based on a recognition that to ensure access to other devices or resources on a network, configuration of networks has required a large amount of individualized attention. In many instances, each device, each user, and/or each connection between a device and network equipment, such as a network switch or access point, must be configured separately during the connection process. For example, a network policy may need to be created and/or assigned for each device, each user, and/or each connection between a device and the network equipment. This individualized attention makes scalability of the deployment of devices difficult.

The present inventive concepts are directed to methods, systems, and devices that automate creation and/or assignment of network policies based on one or more attributes of a device that is connecting or has connected to a network, and/or one or more attributes of a user of the device. For example, a user may be defined as having one or more roles and/or as a member of one or more groups, and a network policy may be assigned to a device identified to be operated by the user based on the one or more roles and/or the one or more groups.

In the discussion that follows, examples of electronic devices are provided that primarily communicate over networks via wired connections, such as those established using Ethernet networking technologies as defined by the Institute of Electrical and Electronics Engineers (IEEE) 802.3 standard. This includes wired connections established between a device and networking equipment, such as a switch, via various physical media, such as coaxial cable, one or more pairs of twisted wire connections, or optical fiber. The present disclosure may not be limited to wired connections, and the inventive concepts disclosed herein may be applicable to devices that communicate wirelessly using radio frequency or optical frequency waves with networking equipment such as an access point. Wireless communication may be according to the IEEE 802.11 standard ('Wi-Fi,'), Bluetooth, Bluetooth Low Energy (BLE), Zigbee, Z-Wave, LoRaWAN, Thread and/or another type of wireless interfaces or wireless standards. The inventive concepts disclosed herein may also be applicable to communications according to other wired or wireless communication protocols (such as Long Term Evolution or LTE, other cellular-telephone communication protocols, etc.).

With reference now to FIG. 1, a networking system 100 may include one or more electronic devices, including end devices 10, 12, 14, 16, 18, and 20; network equipment 30; controller 40; and authentication server 50. Communication among the electronic devices of FIG. 1 may be facilitated in part by a network 60 (which may be an internal network and/or LAN). The network 60 may provide access to one or more network resources 70 and/or one or more external networks 80.

The end devices 10, 12, 14, 16, 18, and 20 may be any electronic device having a networking capability, such as computers, portable electronic devices, telephones, network-connected devices (e.g., surveillance equipment), network-connected appliances and other network-enabled electronic devices. For example, the end devices 10, 12, 14, 16, 18, and 20 can be: a desktop computer, a laptop computer, a subnotebook/netbook, a server, a tablet computer, a smartphone, a cellular telephone, a VoIP phone, a camera, a microphone, an appliance (e.g., a toaster, a refrigerator, an air conditioner, a heater), a consumer-electronic device, a portable computing device, and/or another type of network-capable electronic device. Six end devices are shown in FIG. 1 for illustrative purposes only, and the present disclosure is not limited thereto. In some embodiments there may be more than or less than six end devices.

For purposes of explanation, there are three different types of end devices illustrated in FIG. 1, although the present disclosure is not limited thereto, and in some embodiments there may be more than or less than three different types of end devices. The end devices 10, 12, and 18 may be a first device type (designated by a square in FIG. 1), the end devices 14 and 16 may be a second device type (designated by a circle in FIG. 1, and the end device 20 may be a third device type (designated by a diamond in FIG. 1).

In some embodiments, some or all of the end devices in the networking system 100 may be associated with a user and/or with a plurality of users. For example, end device 10 may be associated with a first user U1, end devices 12 and 14 may be associated with a second user U2, end devices 16 and 18 may be associated with a third user U3, and end device 20 may be associated with a fourth user U4. Associations between users and end devices may be relatively static (e.g., end devices may be assigned to users via (for example) a provisioning system), and/or associations between users and end devices may be relatively dynamic (e.g., a user may log in to an end device for a limited duration of usage, then log out (or be logged out) at the end of the limited duration, releasing the association between the user and the end device). Some networking systems may include a mix of associations between devices and users. In some embodiments, a device may be associated with one or more users (either at the same time, or may be switched between the users). In some embodiments, a "user" may not be a person, but rather a process operated by a computing device such as a user agent, a background process, a daemon, and so on. In some embodiments, some or all devices present within a networking system 100 may not be associated with a user or users.

In some embodiments, users and/or devices may be associated with groups. For example, the first user U1 may be associated with a first group, the second and third users U2 and U3 may be associated with a second group, the first and third users U1 and U3 may be associated with a third group, and the fourth user U4 may not be associated with any group. Groups may provide a logical way of segmenting users; for example, one group may be an "administrators" group, one group may be an "accountants" group, and so on.

Each user and/or each group may be assigned permissions to access resources present in the networking system 100. For example, the first user U1 may be assigned permission such that end device 10 may access network resource 70 (which may be, for example, a server storing sensitive data) via network 60. The first, second, and third users U1, U2, and U3, and end devices thereof may be permitted to access external network 80 via network 60.

Each group and/or each user may be assigned or may assume one or more roles during usage of the networking system 100. A role may be a collection of permissions, and a user may inherit those permissions when assigned or when assuming a role. For example, a user may be initially assigned a customer service representative as a first role and authorized to access read-only some set of data (e.g., customer data) while in the customer service representative role. The user may later be assigned the role of a customer service manager (either replacing the customer service representative role or as a second additional role) in which case the user may be permitted to modify (read-write) the same set of data. Other users in the system may be denied permission to even access the set of data.

In some embodiments, the management and authorization of users and/or devices within the networking system 100 may be performed by the authentication server 50. In some embodiments, the authentication server 50 may be an Authentication, Authorization and Accounting ("AAA") server, which may be used to provide one or more programs and/or protocols that are configured to manage aspects for access to computer resources (e.g., the network resource 70, the external network 80) within a network or networking system (e.g., the networking system 100 of FIG. 1). In some embodiments, the authentication server 50 may interact with servers and databases for obtaining user information, such as Relational Database Management Systems (RDBMS) or Lightweight Directory Access Protocol (LDAP) servers. The authentication server 50 may provide authorization and/or authentication of a user or device. Authentication of a user may include identifying the user via identifying information (e.g., receiving information indicative of the user, such as a login handle, username, or the like), and receiving credential information to use in verification of the correctness of the identifying information. For example, the credential information may be a token, password, passphrase, certificate or the like. In some example embodiments, interactions between the authentication server 50 and other servers and databases (e.g., the networking device 30) may be by a query language, such as LDAP or SQL. In some example embodiments, the authentication server 50 may be configured to receive Remote Authentication Dial-In User Service (RADIUS) requests, process the requests, and return responses. Based on authenticating that the user or device is correct in its assertion as to who or what it claims to be, an authorization may be performed. During the authorization process, entitlements of the user may be defined, such as policy or privileges.

Each of the end devices 10, 12, 14, 16, 18, and 20 may be connected to network equipment 30, which may be a switch.

Figure 2:
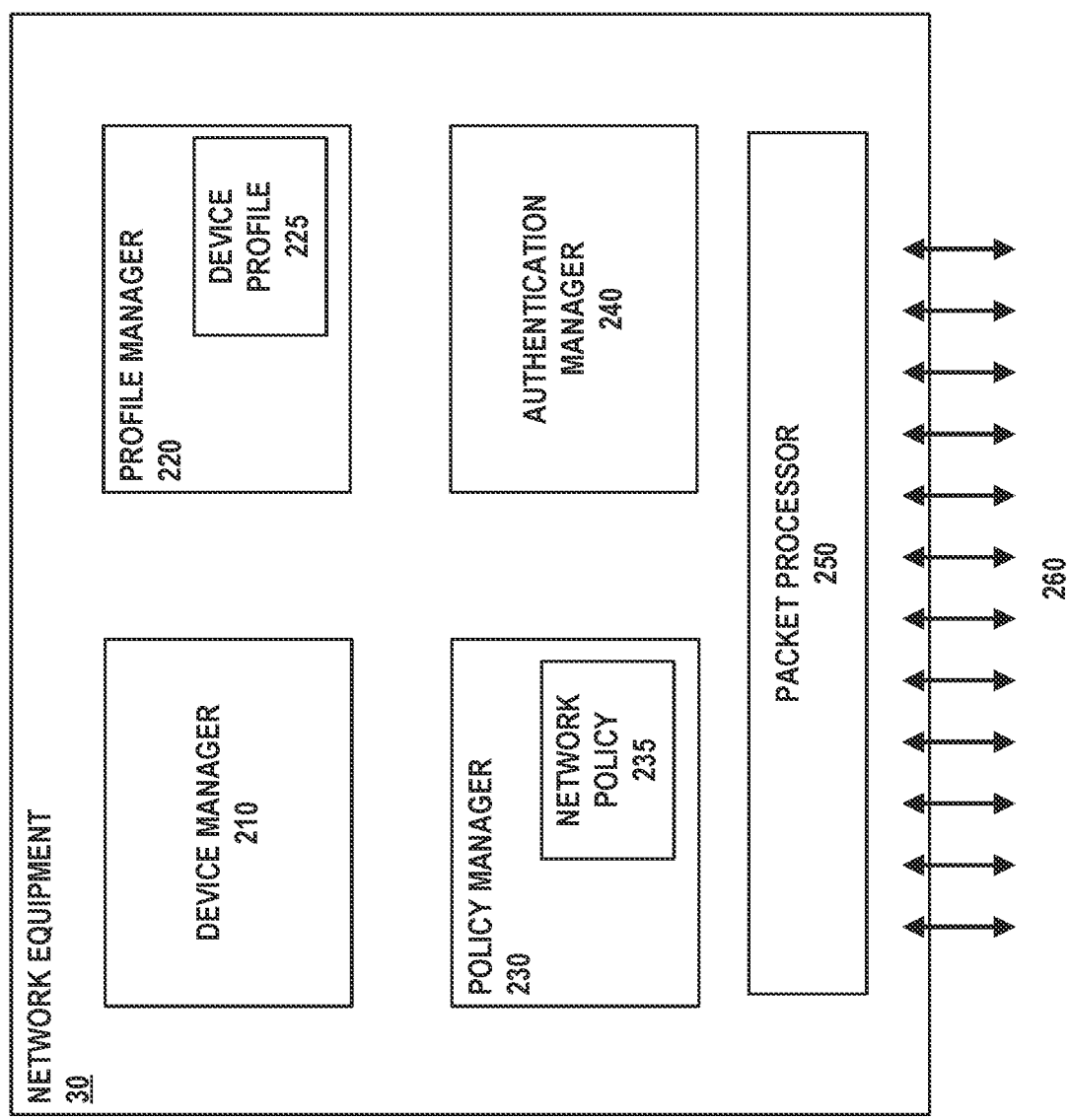
FIG. 2 is a block diagram illustrating an example of a networking equipment within the networking system in accordance with embodiments of the present disclosure.

As best seen in FIG. 2, which shows the network equipment 30 in greater detail, the network equipment 30 may include a number of communication ports 260, and each of the end devices 10, 12, 14, 16, 18, and 20 may be connected to one or more of the communication ports 260. The network equipment 30 may be coupled to the network 60 also via the one or more communication ports 260. In some embodiments, the network equipment 30 may be connected to the controller 40 via a direct connection therebetween, as shown via the dashed line in FIG. 1. The network equipment 30 may also include a packet processor 250, which may facilitate forwarding of packets between the end devices 10-20 and the network 60. The network equipment 30 may comprise more than one piece of equipment. For example, the network equipment 30 may comprise a plurality of network switches.

The controller 40 may be a single device or group of devices that administer and manage equipment within the network 60, including the networking equipment 30. The controller 40 may be optional in some embodiments. In some embodiments, all or a portion of the functionality of controller 40 may be provided within the networking equipment 30. For example, the controller 40 may be configured to administer wired switches and/or wireless access points through a common interface (e.g., a common user interface or administrative dashboard). The controller 40 may be configured to support or provide functionality that facilitates network configuration, monitoring, provisioning, discovery, planning, troubleshooting, performance management, security, and reporting, as examples.

FIG. 2 is a block diagram illustrating the networking equipment 30 within the networking system 100 in greater detail in accordance with embodiments of the present disclosure. The network equipment 30 may also have one or more modules, such as a device manager 210, a profile manager 220, a policy manager 230, and an authentication manager 240. These modules can be implemented in hardware and/or in software. In some embodiments, these modules can be embodied in computer-executable instructions stored in a memory which is coupled to one or more processors in network equipment 30. When executed, these instructions cause the processor(s) to perform the functionality of the modules. Although four modules are shown in FIG. 2, the segmentation of the functionality into separate modules is only for illustrative purposes, and the present disclosure is not limited thereto. For example, some or all of the functionality described with reference to the device manager 210, the profile manager 220, the policy manager 230, and the authentication manager 240 may be provided within a single (e.g., "monolithic") module, or segmented into two, three, four, or more than four modules. Moreover, various functionality described herein as being performed by the device manager 210, the profile manager 220, the policy manager 230, and the authentication manager 240 may instead be performed by another device within the networking system 100 of FIG. 1, such as the controller 40.

In some embodiments, the device manager 210 may be configured to receive data (such as network traffic or portions of network traffic) communicated from an end device 10-20 and identify a type of the end device 10-20 based on the received data. For example, the packet processor 250 may be configured to forward a copy of a packet or Ethernet frame received from the end device 10-20, a header (or portion thereof) of the packet or Ethernet frame received from the end device 10-20, and/or a payload (or portion thereof) of the packet or Ethernet frame received from the end device 10-20 for processing by the device manager 210.

The information received from the packet processor 250 may be examined by the device manager 210, and device type information may be identified therefrom. For example, the end device 10-20 may communicate information such as a vendor, a MAC address, or other device type identifying information within the packet or Ethernet frame, and this information may be extracted from the packet or Ethernet frame and examined by the device manager 210. Other methods of device type identification may include Link Layer Discovery Protocol (LLDP) related methods, Dynamic Host Configuration Protocol (DCHP) related methods, and MAC Organizationally Unique Identifiers (OUI) related methods.

In some embodiments, the profile manager 220 may manage device profiles 225, which may establish a mapping between device types and network policies. A device profile 225 may be defined for each device type by an administrator, for example using a user interface. In some embodiments, an administrators may group users and/or devices (e.g., IoT sensors, servers) into different security groups so as to define policies at the group level, and the profile manager 220 may be tasked with mapping the different security groups (and the users and/or devices thereof) to network policies 235 managed by the policy manager 230.

In some embodiments, the policy manager 230 may manage one or more network policies 235. Network policies 235 may be defined for each device type and/or each user by an administrator, for example using a user interface. For example, a network policy 235 may define a specific quality-of-service (QoS) policy for traffic to which the network policy 235 is applied. Additionally or alternatively, a network policy may define the virtual networks/VLANs that an end device is "connected" to, and the network policy 235 may also define membership in one or more virtual networks/VLANs for a port of the networking equipment 30 to which the end device is attached. Additionally or alternatively, a network policy 235 may define an access control list (ACL), which may be used to filter network traffic.

In some embodiments, a device profile 225 (managed by profile manager 220) may indicate whether the device type associated with the device profile requires authentication. As such, in some embodiments, the authentication manager 240 may be configured to contact an authenticating device (e.g., the authentication server 50) and pass credential information from the end device 10-20 to the authenticating device so that the authenticating device can authenticate the end device. If the authentication is successful (e.g., the authenticating device returns a successful result), the network equipment 30 may apply a first network policy 235, which may be the network policy mapped to the device type in the device profile. If authentication fails (e.g., the authenticating device does not return a successful result), then the network equipment 30 may apply a second network policy 235, which may be in some embodiments a limited access network policy. In some embodiments, if a device profile 225 does not require authentication, then the corresponding network policy 235 may be automatically applied based on the detected device type. In some embodiments, if a device type is unknown or not detectable, a default or generic network policy 235 may be applied.

In some embodiments, an administrator may use user interfaces generated by the network equipment 30 to create and maintain device profiles 225 and/or network policies 235. In some embodiments, an administrator may use a controller 40 to control network equipment 30, and may use user interfaces generated by controller 40 to create and maintain device profiles 225 and/or network policies 235.

Figure 3:
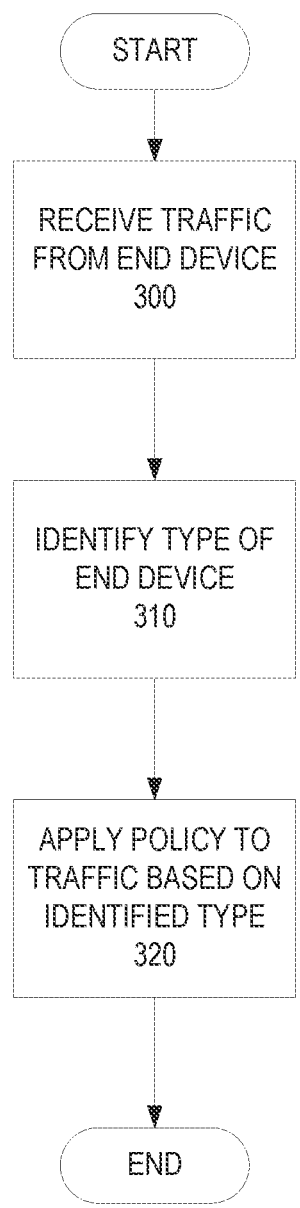
FIG. 3 is a flowchart illustrating example operations of methods of assigning policies to end devices within the networking system in accordance with an embodiment of the present disclosure.
Figure 4:
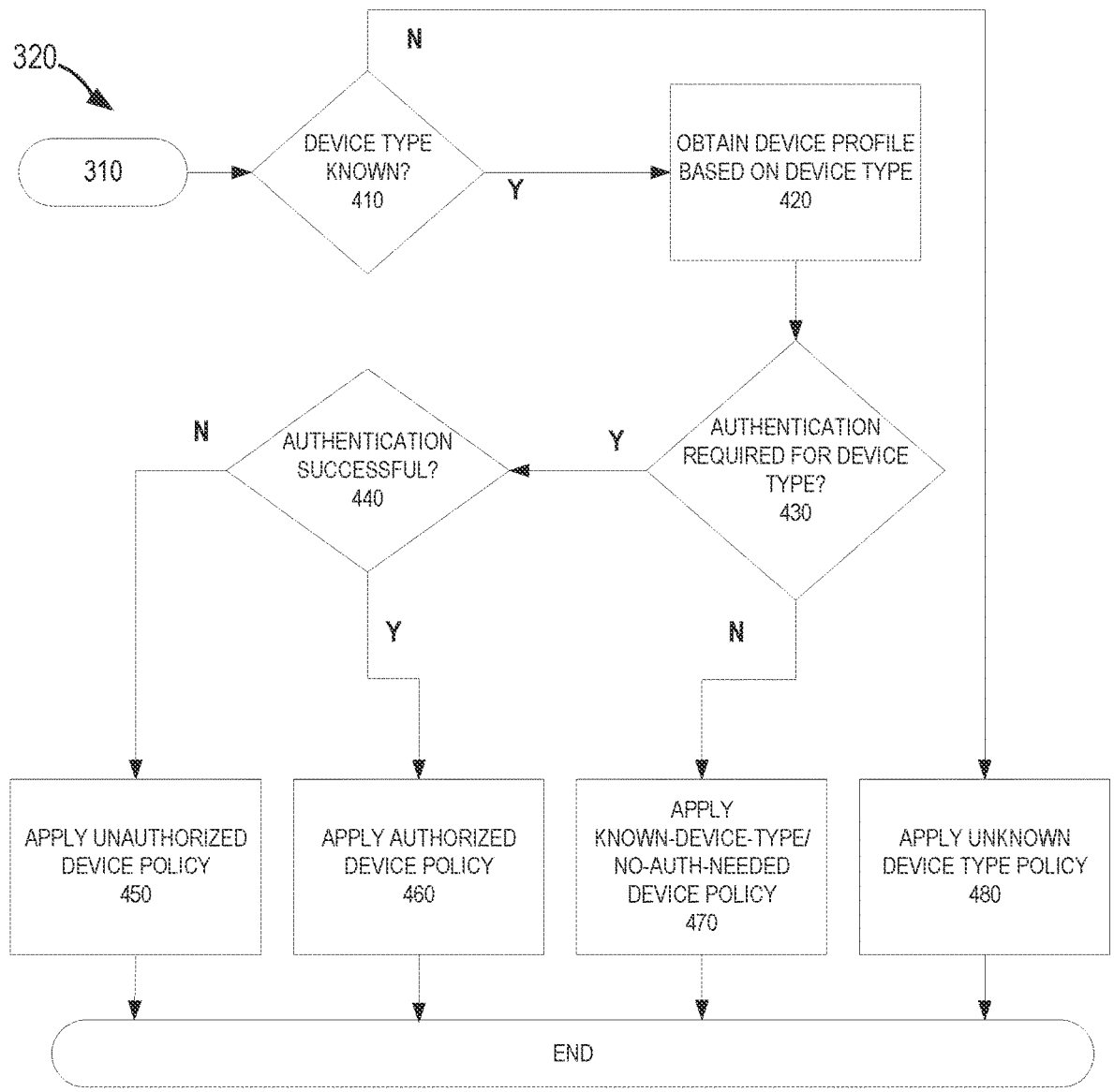
FIG. 4 is a flowchart illustrating aspects of one operation illustrated in FIG. 3 in greater detail.

FIG. 3 is a flowchart illustrating example operations of methods of assigning policies to end devices within the networking system in accordance with an embodiment of the present disclosure. FIG. 4 is a flowchart illustrating aspects of one operation illustrated in FIG. 3 in greater detail.

In operation 300 of FIG. 3, traffic may be received by a network equipment 30 from an end device 10-20. This traffic may include one or more data packets and/or one or more control packets. In some embodiments, the traffic may include one or more packets being communicated by the end device 10-20 to establish a connection and/or link between the end device 10-20 and the network equipment 30. Based on the received traffic, in operation 310 the network equipment 30 may identify a type of the end device 10-20. Based on the identified device type of the end device 10-20 (or based on identifying the end device 10-20 as an unknown device type), in operation 320 a network policy may be applied to the traffic communicated between the end device 10-20 and the network equipment 30.

Operation 320 is described in greater detail with reference to FIG. 4. In operation 410, it may be checked whether the device type of the end device 10-20 is known. If the device type is not known ("N" branch from operation 410), then an unknown device type network policy may be applied to the network traffic between the end device 10-20 and the network equipment 30. Otherwise, if the device type is known ("Y" branch from operation 410), then in operation 420 a device profile 225 may be obtained based on the identified device type. For example, the device profile 225 may be obtained by or from the profile manager 220.

In operation 430, the device profile 225 may be examined to check whether authentication is required for the identified device type. If authentication is not required ("N" branch from operation 430), then a known-device-type no-authorization-needed network policy may be applied to the network traffic between the end device 10-20 and the network equipment 30 in operation 470. The known-device-type no-authorization-needed network policy may be a network policy defined by the user in the device profile 225.

If authentication is required ("Y" branch from operation 430) then the network equipment 30 may communicate the information to an authenticating device such as the authentication server 50 (via the authentication manager 240) and may await for a response from the authenticating device. The authentication response received, if any, may be examined in operation 440. If authentication is successful ("Y" branch from operation 440), then a known-device-type authorization-successful network policy may be applied to the network traffic between the end device 10-20 and the network equipment 30 in operation 460. The known-device-type authorization-successful network policy may be a network policy defined by the user in the device profile 225.

On the other hand, if authentication is not successful ("N" branch from operation 440), then known-device-type authorization-unsuccessful network policy may be applied to the network traffic in operation 450. The known-device-type authorization-unsuccessful network policy may be a network policy defined by the user in the device profile 225, and/or may be a generic network policy for unauthorized devices and/or users.

Figure 5A:
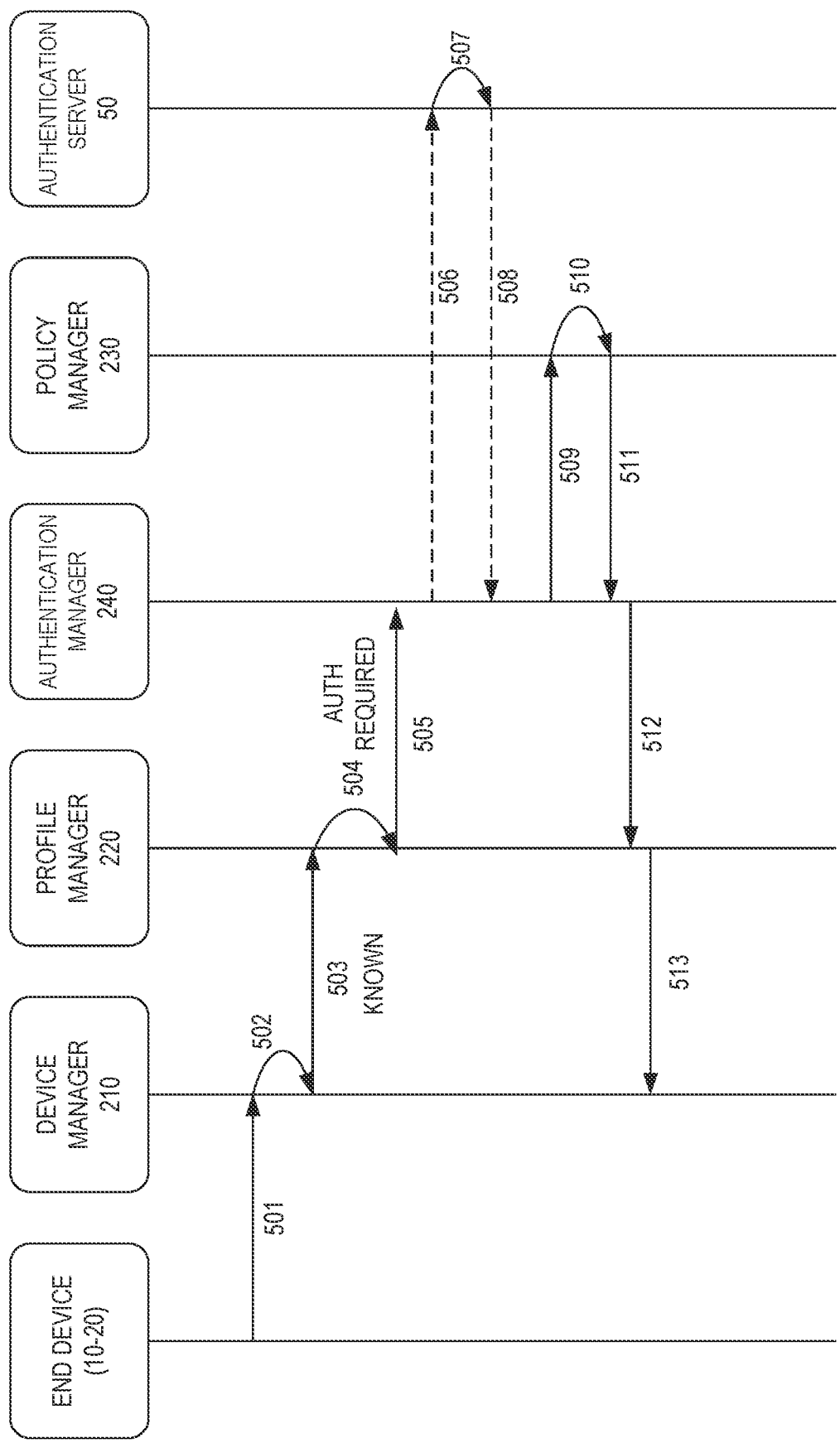
FIGS. 5A, 5B, and 5C are communication flow diagrams illustrating communication among and within the various electronic devices in FIG. 1 in accordance with embodiments of the present disclosure.
Figure 5B:
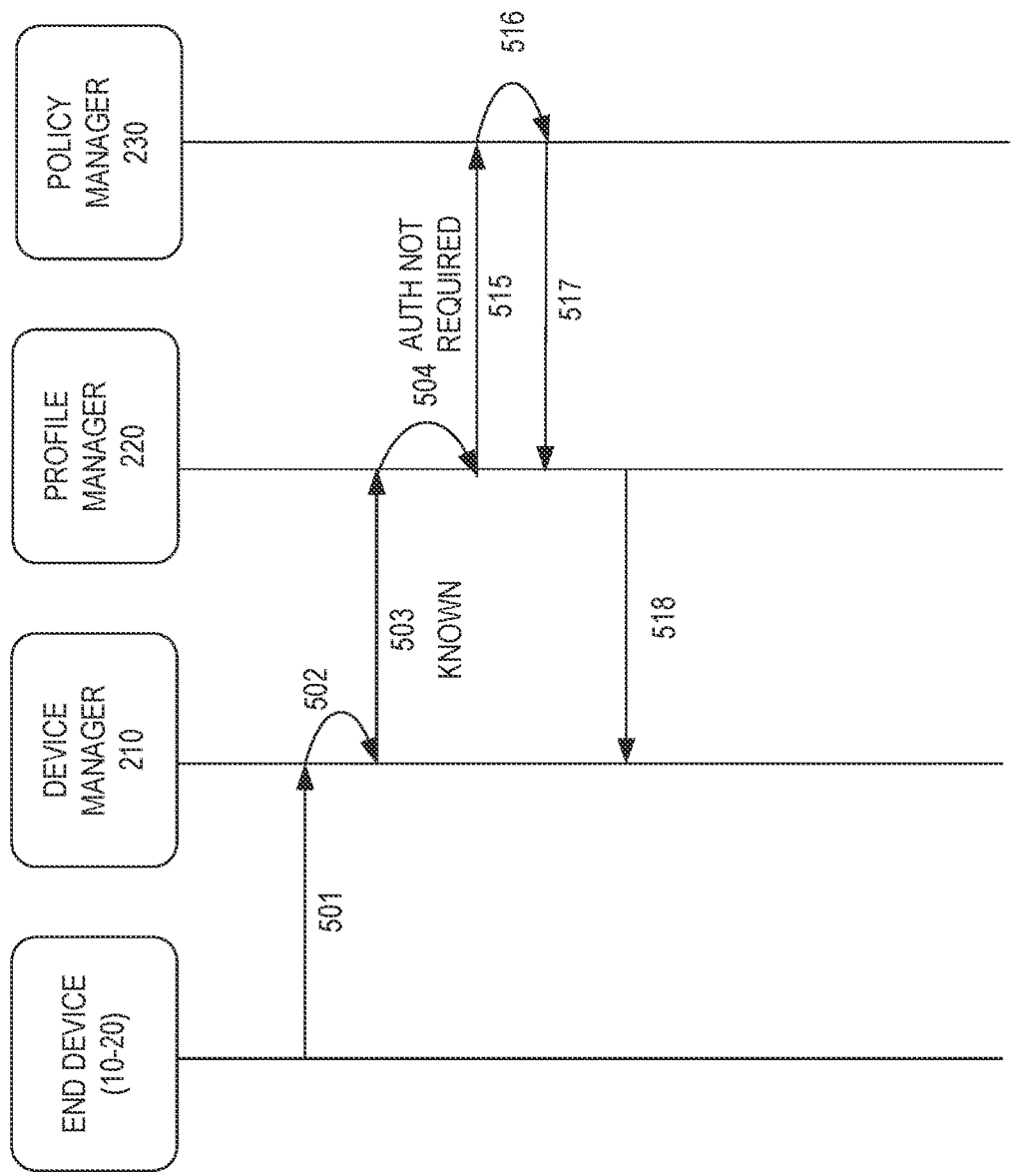
Figure 5C:
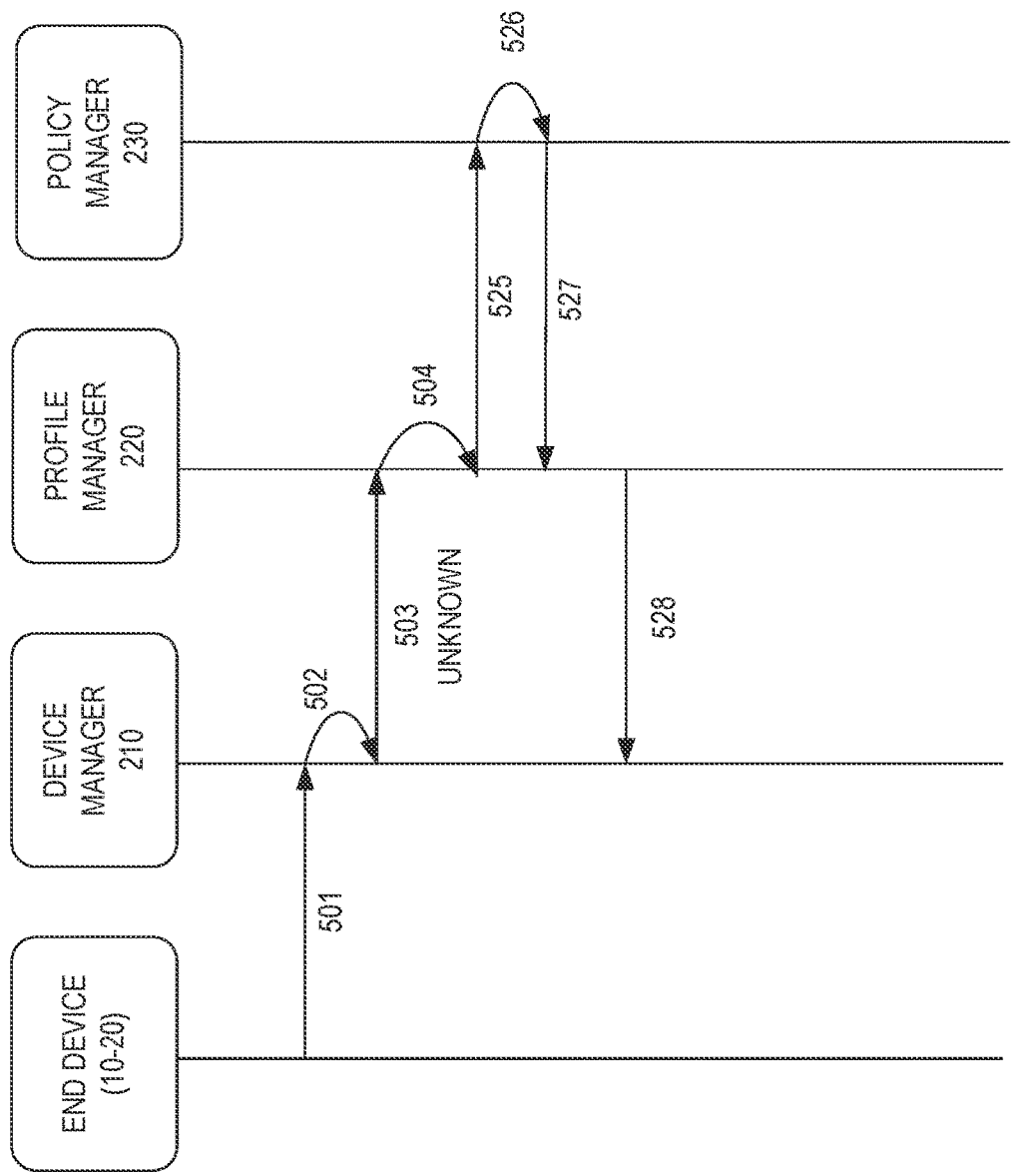

FIGS. 5A, 5B, and 5C are communication flow diagrams illustrating communication among and within the various electronic devices in FIG. 1 in accordance with embodiments of the present disclosure. FIG. 5A presents a communication flow in a situation where the device type of the end device 10-20 is known, and the device profile 225 associated with the device type indicates that authorization is required. Traffic 501 may be communicated from the end device 10-20 to the network equipment 30 (which may include in some embodiments traffic communicated via a packet processor 250 of the network equipment 30) and to a device manager 210. The device manager 210 may examine the traffic 501 and identify a device type 502 based on the examined traffic. The device type 502 may be provided 503 to the profile manager 220. Based on the device type, the profile manager 220 may access a device profile 504. In the example situation, authentication is required for this device type, and the profile manager 220 and the authentication manager 240 may communicate an authentication request 505/506 to the authentication device (e.g., authentication server 50). The authorization server may attempt to perform the authentication 507 and provide a result of the authentication 508. If the authentication is successful then the authentication manager 240 may communicate the success 509 to the policy manager 230, which may retrieve a known-device-type authorization-successful network policy 510 (that is identified by the device profile 225) and communicate the same back to the authentication manager (511), profile manager (512) and device manager (513). If the authentication is unsuccessful then the authentication manager 240 may communicate the failure to authenticate 509 to the policy manager 230, which may retrieve a known-device-type authorization-unsuccessful network policy 510 and communicate the same back to the authentication manager (511), profile manager (512) and device manager (513). The known-device-type authorization-unsuccessful network policy may be a network policy identified by the device profile 225 (e.g., may be a device-type-specific network policy), or may be a generic network policy designated by an administrator to use in all instances where authorization is unsuccessful.

FIG. 5B presents a communication flow in a situation where the device type of the end device 10-20 is known, and the device profile 225 associated with the device type indicates that authorization is not required. Aspects 501-504 are in essence the same as above and reference is made to the previous description thereof. In the example situation, as authentication is not required for this device type, the profile manager 220 may communicate 515 this to the policy manager 230, which may retrieve a known-device-type authorization-not-required network policy 516 (that is identified by the device profile 225) and communicate the same back to the profile manager (517), and device manager (518).

FIG. 5C presents a communication flow in a situation where the device type of the end device 10-20 is not known. Aspects 501-504 are in essence the same as above and reference is made to the previous description thereof. In the example situation, as the device type is not known for this end device 10-20, the profile manager 220 may communicate 525 to the policy manager 230, which may retrieve a unknown-device-type network policy 526 and communicate the same back to the profile manager (527), and device manager (528). The unknown-device-type network policy may be a generic network policy designated by an administrator to use in all instances where the device type is unknown. In some embodiments, the unknown-device type network policy and the known-device-type authorization-unsuccessful network policy may have similar attributes. In some embodiments, the unknown-device type network policy and the known-device-type authorization-unsuccessful network policy may be the same network policy.

Figure 6:
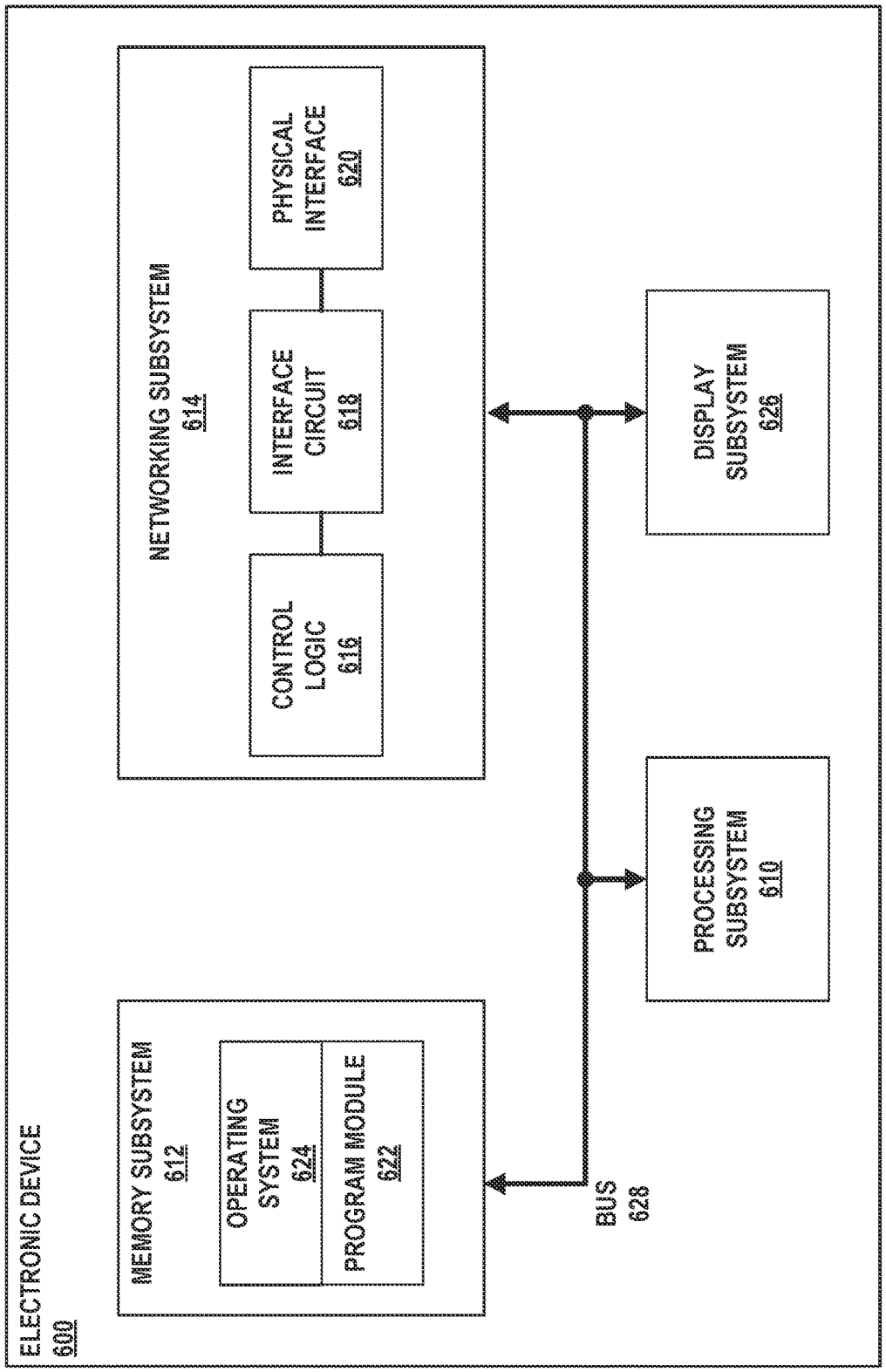
FIG. 6 is a block diagram illustrating an example of an electronic device in accordance with an embodiment of the present disclosure.

FIG. 6 provides a block diagram of an example of an electronic device, aspects or components of which may be present in the various electronic devices described herein (e.g., the end devices 10, 12, 14, 16, 18, and 20 of FIG. 1, the network equipment 30 of FIG. 1, the controller 40 of FIG. 1, the authentication server 50 of FIG. 1, and so on). FIG. 6 presents a block diagram illustrating an electronic device 600 in accordance with some embodiments. The electronic device 600 may include a processing subsystem 610, a memory subsystem 612, and a networking subsystem 614.

The processing subsystem 610 may include one or more devices configured to perform computational operations. For example, the processing subsystem 610 can include one or more microprocessors, ASICs, microcontrollers, programmable-logic devices, and/or one or more digital signal processors (DSPs,).

The memory subsystem 612 may include one or more devices for storing data and/or instructions for the processing subsystem 610 and/or the networking subsystem 614. For example, the memory subsystem 612 can include dynamic random access memory (DRAM), static random access memory (SRAM), and/or other types of memory. In some example embodiments, instructions for the processing subsystem 610 stored in the memory subsystem 612 include: one or more program modules or sets of instructions (such as a program module 622 or an operating system 624), which may be executed by the processing subsystem 610. Note that the one or more computer programs may constitute a computer-program mechanism. In some embodiments, the memory subsystem 612 may be coupled to or may include one or more storage devices (not shown). For example, the memory subsystem 612 can be coupled to a magnetic or optical drive, a solid-state drive, or another type of mass-storage device. In these embodiments, the memory subsystem 612 can be used by electronic device 600 as fast-access storage for often-used data, while the storage device is used to store less frequently used data.

The networking subsystem 614 may include one or more devices configured to couple to and communicate on a wired and/or wireless network (i.e., to perform network operations), including: control logic 616, an interface circuit 618 and one or more interfaces 620 (e.g., ports, antennas, antenna elements). For example, the networking subsystem 614 can include an Ethernet networking system, a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), and/or another networking system. The networking subsystem 614 may include processors, controllers, radios/antennas, sockets/plugs, and/or other devices used for establishing a connection using each supported networking system, coupling to each supported networking system, communicating on each supported networking system, and handling data and events for each supported networking system. Note that mechanisms used for establishing connections, coupling to networks, communicating on networks, and handling data and events on the network for each network system are sometimes collectively referred to as a 'network interface' for the network system.

Within an electronic device 600, the processing subsystem 610, the memory subsystem 612, and the networking subsystem 614 may be coupled together using a bus 628. The bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 may include a display subsystem 626 for displaying information on a display (not shown), which may include a display driver and the display, such as a liquid-crystal display, a multi-touch touchscreen, etc.

The electronic device 600 can be (or can be included in) any electronic device with at least one network interface. For example, the electronic device 600 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a controller, a router, a switch, communication equipment, test equipment, and/or another electronic device.

Although specific components are used to describe the electronic device 600, in some example embodiments, different components and/or subsystems may be present in electronic device 600. For example, the electronic device 600 may include one or more additional processing subsystems, memory subsystems, networking subsystems, and/or display subsystems. Additionally, one or more of the subsystems may not be present in an example electronic device 600. Moreover, in some embodiments, the electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in an electronic device 600. For example, in some embodiments the program module 622 may be included in the operating system 624 and/or the control logic 616 may be included in the interface circuit 618.

The foregoing descriptions of embodiments of the present disclosure have been presented for purposes of illustration and description only. They are not intended to be exhaustive or to limit the present disclosure to the forms disclosed. Accordingly, many modifications and variations of the inventive concepts will be apparent to those skilled in the art, and the inventive concepts defined herein may have applicability to other embodiments and applications without departing from the scope of the present disclosure.

What is claimed is:

1. A method comprising:
   receiving, by a first electronic device, network traffic from a second electronic device;
   identifying, based on the network traffic received from the second electronic device, a device type of the second electronic device; and
   applying a network policy to subsequent network traffic between the first electronic device and the second electronic device based on the identified device type of the second electronic device,
   wherein applying the network policy to the subsequent network traffic comprises:
      identifying that the device type is a known device type;
      retrieving a device profile that is associated with the identified device type of the second electronic device and that indicates that authorization of the second electronic device and/or a user of the second electronic device is required;
      communicating authentication information from the first electronic device to an authenticating device;

receiving an indication from the authenticating device that the second electronic device and/or the user of the second electronic device is authorized; and applying the network policy based on the indication that the second electronic device and/or the user of the second electronic device is authorized.

2. The method of claim 1, wherein the network policy is indicated by the device profile.

3. The method of claim 1, wherein the first electronic device is a network switch.

4. A method comprising:

receiving, by a first electronic device, network traffic from a second electronic device;

identifying, based on the network traffic received from the second electronic device, a device type of the second electronic device; and applying a network policy to subsequent network traffic between the first electronic device and the second electronic device based on the identified device type of the second electronic device, wherein applying the network policy to the subsequent network traffic comprises:

identifying that the device type is a known device type;

retrieving a device profile that is associated with the identified device type of the second electronic device and that indicates that authorization of the second electronic device and/or a user of the second electronic device is required;

communicating authentication information from the first electronic device to an authenticating device;

receiving an indication from the authenticating device that the second electronic device and/or the user of the second electronic device is not authorized; and applying the network policy based on the indication that the second electronic device and/or the user of the second electronic device is not authorized.

5. The method of claim 4, wherein the network policy is indicated by the device profile.

6. The method of claim 4, wherein the first electronic device is a network switch.

7. A method comprising:

receiving, by a first electronic device, network traffic from a second electronic device;

identifying, based on the network traffic received from the second electronic device, a device type of the second electronic device;

retrieving a device profile associated with the identified device type of the second electronic device;

detecting that the device profile indicates that authorization of the second electronic device and/or a user of the second electronic device is required;

communicating authentication information from the first electronic device to an authenticating device; and selectively applying a first network policy or a second network policy to subsequent network traffic between the first electronic device and the second electronic device based on a received communication from the authenticating device indicating an authorization status of the second electronic device and/or the user.

8. The method of claim 7, wherein the first network policy is applied to the subsequent network traffic when the received communication indicates that the second electronic device and/or the user is authorized, and the second network policy is applied to the subsequent network traffic when the received communication indicates that the second electronic device and/or the user is not authorized.

9. The method of claim 8, wherein the first network policy is indicated by the device profile.

10. The method of claim 7, wherein the first electronic device is a network switch.

* * * * *